United States Patent
Lundgren et al.

(10) Patent No.: US 6,571,551 B2
(45) Date of Patent: Jun. 3, 2003

(54) HEAT EXCHANGER FOR $SO_x$ OR $NO_x$ REGENERATION OF CATALYST

(75) Inventors: Staffan Lundgren, Hindås (SE); Jacob Claesson, Göteborg (SE); Maria Hansson, Göteborg (SE); Lars Sandberg, Göteborg (SE); Mikael Larsson, Mölndal (SE)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/681,681

(22) Filed: May 19, 2001

(65) Prior Publication Data

US 2002/0000089 A1 Jan. 3, 2002

Related U.S. Application Data

(63) Continuation of application No. PCT/SE99/02090, filed on Nov. 16, 1999.

(30) Foreign Application Priority Data

Nov. 20, 1998 (SE) ............................................... 9803990

(51) Int. Cl.[7] .................................................. F01N 3/00
(52) U.S. Cl. .............................. 60/298; 60/285; 60/295; 60/320; 60/297; 123/295; 123/430
(58) Field of Search .......................... 60/285, 286, 298, 60/320, 321, 297, 295; 123/295, 430, 305

(56) References Cited

U.S. PATENT DOCUMENTS

| | | |
|---|---|---|
| 5,461,857 A | 10/1995 | Itou et al. |
| 5,595,060 A | 1/1997 | Togai et al. |
| 5,687,565 A * | 11/1997 | Modica et al. ................ 60/274 |
| 5,775,099 A * | 7/1998 | Ito et al. ....................... 60/274 |
| 5,970,948 A * | 10/1999 | Yasouka ..................... 123/295 |
| 5,979,159 A * | 11/1999 | Adamczyk et al. ........... 60/274 |
| 6,003,306 A * | 12/1999 | Kalversberg et al. ......... 60/274 |
| 6,155,212 A * | 12/2000 | McAlister ...................... 123/3 |
| 6,327,847 B1 * | 12/2001 | Surnilla et al. ............... 60/274 |

FOREIGN PATENT DOCUMENTS

| | | |
|---|---|---|
| DE | 4410022 A1 | 10/1995 |
| DE | 19706608 A1 | 8/1998 |
| DE | 29708011 U1 | 10/1998 |
| DE | 19731624 A1 | 1/1999 |
| DE | 19746658 A1 | 4/1999 |
| EP | 0498598 A1 | 8/1992 |

* cited by examiner

*Primary Examiner*—Thomas Denion
*Assistant Examiner*—Binh Tran
(74) *Attorney, Agent, or Firm*—Howrey, Simon, Arnold & White LLP

(57) ABSTRACT

A device for use with a lean-burning internal combustion engine is disclosed. The device is comprised of a means for generating an air/fuel mixture for the cylinders of the engine in order to provide at least stratified and homogenous operation, an exhaust system connected to the engine, and an $NO_x$-adsorbing catalytic converter arranged in the exhaust system. The device additionally has a heat exchanger that is fitted upstream of the catalytic converter, wherein the heat exchanger is used to adapt the temperature of the exhaust gas from the engine to an operating state of the catalytic converter.

20 Claims, 3 Drawing Sheets

HEAT EXCHANGER FOR $SO_X$ OR $NO_X$ REGENERATION OF CATALYST

CROSS REFERENCE TO RELATED APPLICATIONS

This is a continuation patent application of International Application Number PCT/SE99/02090 filed Nov. 16, 1999 which designates the United States; the disclosure of that application is expressly incorporated in its entirety.

BACKGROUND OF INVENTION

1. Technical Field

The present invention relates to a device for use with an internal combustion engine, particularly a lean burning engine. Furthermore, the invention is intended for use with the exhaust system of an internal combustion engine, with the exhaust system having a $NO_X$ absorber.

2. Background Information

Vehicles operating with an internal combustion engine must meet the general requirement of low level of harmful substances in the exhaust gas coming from the engine. These substances are predominantly compounds such as nitrogen oxides ($NO_X$), hydrocarbons (HC) and carbon monoxide (CO). In the case of modern internal combustion engines, the exhaust gas is normally purified with the aid of a catalytic converter, which is part of the exhaust system and through which the exhaust gas is passed. Known "three-way catalysts" remove the predominant part of the above harmful compounds through catalytic reactions. In order that the catalyst gives the highest possible degree of purification with respect to $NO_X$, HC and CO, the engine is run on a stoichiometric mixture of air and fuel, i.e., one with a lambda value ($\lambda$) of 1 in most operating modes.

Although modern three-way catalysts enable a very high degree of purification thereby greatly reducing the emission of harmful compounds into the atmosphere, there is a continual need for further reductions in the emission of harmful substances. This is in part due to the increasingly rigorous legislation introduced in various countries, requiring an extremely low emission of $NO_X$, CO and HC compounds.

Furthermore, it is a general requirement that vehicles have the lowest possible fuel consumption. This has recently led to the development of engines with a new type of combustion chamber for the cylinders of the engine, making it possible to run the engine on ever leaner fuel mixtures, i.e., on mixtures with a lambda value ($\lambda$) greater than 1. Such engines are generally called "lean-burn" engines. A direct-injection (or "DI") engine, which is a spark-ignition engine with direct injection, operates in a "stratified" manner. Here, fuel introduced into the engine's combustion chamber is concentrated to a great extent at the sparking plugs. When working in certain modes, such as under a low or medium engine loading, these engines are able to run on very lean air/fuel mixtures with a lambda value of the order of magnitude of 4. This considerably increases the fuel economy for these types of engines. A direct-injection engine can also run in a "homogeneous" manner in certain modes of operation, mainly when driven under a high engine loading. The homogeneous operation corresponds to a stoichiometric (i.e., a relatively rich) air/fuel mixture being fed into the engine.

Since, in certain modes of operation, a direct-injection engine works on a very lean air/fuel mixture, the exhaust gas mixture that consequently flows through the three-way catalyst is also lean. As such, the three-way catalyst cannot reduce the $NO_X$ compounds in the exhaust gas since it is designed to give an optimum purification in the case of a stoichiometric mixture. To remedy this, the ordinary three-way catalyst is combined with a nitrogen oxide adsorber, also called a $NO_X$ adsorber or $NO_X$ trap. The purpose of this arrangement is to adsorb the $NO_X$ compounds, e.g., from the exhaust gas of an internal combustion engine. These $NO_X$ adsorbers can thus be installed and used in conjunction with a conventional three-way catalyst.

A $NO_X$ adsorber may be arranged as a separate unit located upstream of the ordinary three-way catalyst, or alternatively it may be integrated with the three-way catalyst, i.e., combined with the catalytic material in the three-way catalyst. The $NO_X$ adsorber takes up (adsorbs) $NO_X$ compounds present in the exhaust gas of an engine when it is run on a lean air/fuel mixture, and gives off (desorbs) the $NO_X$ compounds when the engine is being run on a rich air/fuel mixture for a certain time.

Furthermore, the $NO_X$ adsorber can only adsorb the $NO_X$ compounds up to a certain limit, i.e., it gradually "gets full" with its adsorption capacity reaching its limit. When this happens, the $NO_X$ adsorber has to be regenerated, which means that it must be made to desorb and release accumulated $NO_X$ compounds. If there is a conventional three-way catalyst downstream of the $NO_X$ adsorber, these desorbed $NO_X$ compounds can be eliminated in the three-way catalyst, provided that the latter has reached its operating temperature.

The $NO_X$ adsorber can be regenerated by making the exhaust gas that passes through it relatively rich for a certain time. This is achieved by running the engine on a relatively rich air/fuel mixture for a short time, e.g., for a few seconds. In doing so, the $NO_X$ adsorber is depleted so that it can again adsorb $NO_X$ compounds for a certain time before another regeneration is needed. U.S. Pat. No. 5,461,857 describes achieving regeneration by controlling the concentration of air in the exhaust gas mixture flowing through the $NO_X$ adsorber.

A $NO_X$ adsorber is designed to operate at a certain temperature, which, in turn, depends on the mode of operation of the engine at the time. During stratified operation, i.e., in the case of a lean air/fuel mixture, the temperature of exhaust gas flowing through the $NO_X$ adsorber should be about 200 to about 500° C. if operation of the adsorber is to be optimized. Furthermore, it is a general requirement that the exhaust gas temperature should not exceed about 800° C. because the $NO_X$ adsorber may be damaged at higher temperatures.

A phenomenon that occurs in a $NO_X$ adsorber is that sulfur compounds, such as sulfur dioxide ($SO_2$), present in exhaust gas flowing through the $NO_X$ adsorber, form a deposit on the active material of the $NO_X$ adsorber. Having this deposit on it prevents the $NO_X$ adsorber from adsorbing $NO_X$ compounds. The sulfur compounds come from the fuel and vary with the quality of the fuel. As a result of this a sulfur deposit, the adsorption capacity of the $NO_X$ adsorber progressively decreases with time.

To remedy the problem of this sulfur deposit, the $NO_X$ adsorber is regenerated at set intervals in order to free the absorber from these compounds. As known in the art, such sulfur regeneration can be carried out by running the engine for a certain time wherein a rich exhaust gas with a lambda value of less than 1 is produced while the exhaust gas has a relatively high temperature, specifically one in excess of about 650° C. In this manner, sulfur compounds are desorbed, i.e., they are discharged from the $NO_X$ adsorber. As known in the art, this sulfur regeneration is preferably done at intervals based upon how much of the $NO_X$ storage capacity of the $NO_X$ adsorber has been lost. The loss of storage capacity is estimated from the sulfur content of the fuel and the fuel consumption of the vehicle in question.

However, a problem that occurs in the prior art with the sulfur regeneration is that it is difficult to reconcile the desired exhaust gas temperature when running a lean fuel mixture. This desired gas temperature for a lean fuel mixture is about 200 to about 500° C. However, in order to carry out sulfur regeneration, it should be at least about 650° C. in the $NO_X$ adsorber. This problem can be conventionally solved by raising the exhaust gas temperature during sulfur regeneration, e.g., by delaying the ignition timing for the cylinders of the engine. However, this measure is not sufficient to raise the exhaust gas temperature to the required value if the vehicle in question is never run under a high engine loading, which happens with certain types of drivers and certain types of driving situations.

Accordingly, there is a need to resolve the conflicting requirements of a high temperature of at least about 650° C. needed for sulfur regeneration, and a relatively low temperature of about 200–500° C. that occurs when running a lean mixture and sulfur regeneration is needed. Further, the temperature must stay below about 800° C. under all conditions in order to avoid damaging the $NO_X$ adsorber.

This problem may be solved by introducing a bypass construction into the exhaust system whereby exhaust gas is passed along different routes through the exhaust system depending on the temperature. However, this solution requires a costly valve arrangement, and such a separate valve arrangement in the exhaust system might also jeopardize the reliability of the latter.

SUMMARY OF INVENTION

The present invention provides an improved device for removing harmful substances emitted by an internal combustion engine. In particular, the invention provides a device that ensures the right working temperature of an $NO_X$ adsorber connected to an internal combustion engine. This is achieved with the aid of a device having a heat exchanger that is fitted upstream of a $NO_X$-adsorber catalytic converter used to adapt the temperature of the exhaust gas from the engine to the operating state of the catalytic converter.

The present invention relates to a device that comprises a control system or means for generating an air/fuel mixture for the cylinders of the engine, an exhaust system connected to the engine, and an $NO_X$-adsorbing catalytic converter arranged in the exhaust system. The invention also comprises a heat exchanger that is fitted upstream of the catalytic converter, and which is used to adapt the temperature of the exhaust gas from the engine to the operating state of the catalytic converter at the time.

The present invention offers several advantages. First of all, using a heat exchanger in conjunction with a direct-injection engine makes it possible to adapt the temperature of the exhaust gas flowing through the catalytic converter to match the mode of operation of the engine at the time. It should be mentioned here that the device according to the invention is a "passive system", which does not call for a separate valve arrangement or the like to effect this temperature adaptation. For the sulfur regeneration of the catalytic converter, an exhaust gas temperature that lies in the range of about 650 to about 800° C. is needed for satisfactory operation. Moreover, the use of the device according to the invention does not mean that the back pressure in the exhaust system is less favorable than in the conventional exhaust system, which would reduce the torque. Furthermore, the device according to the invention can be fitted in a vehicle with relatively small available space and with a fully effective cooling surface area.

BRIEF DESCRIPTION OF DRAWINGS

The invention is described below in more detail with reference to a preferred embodiment and the attached drawings, where.

DETAILED DESCRIPTION

Figure 1:
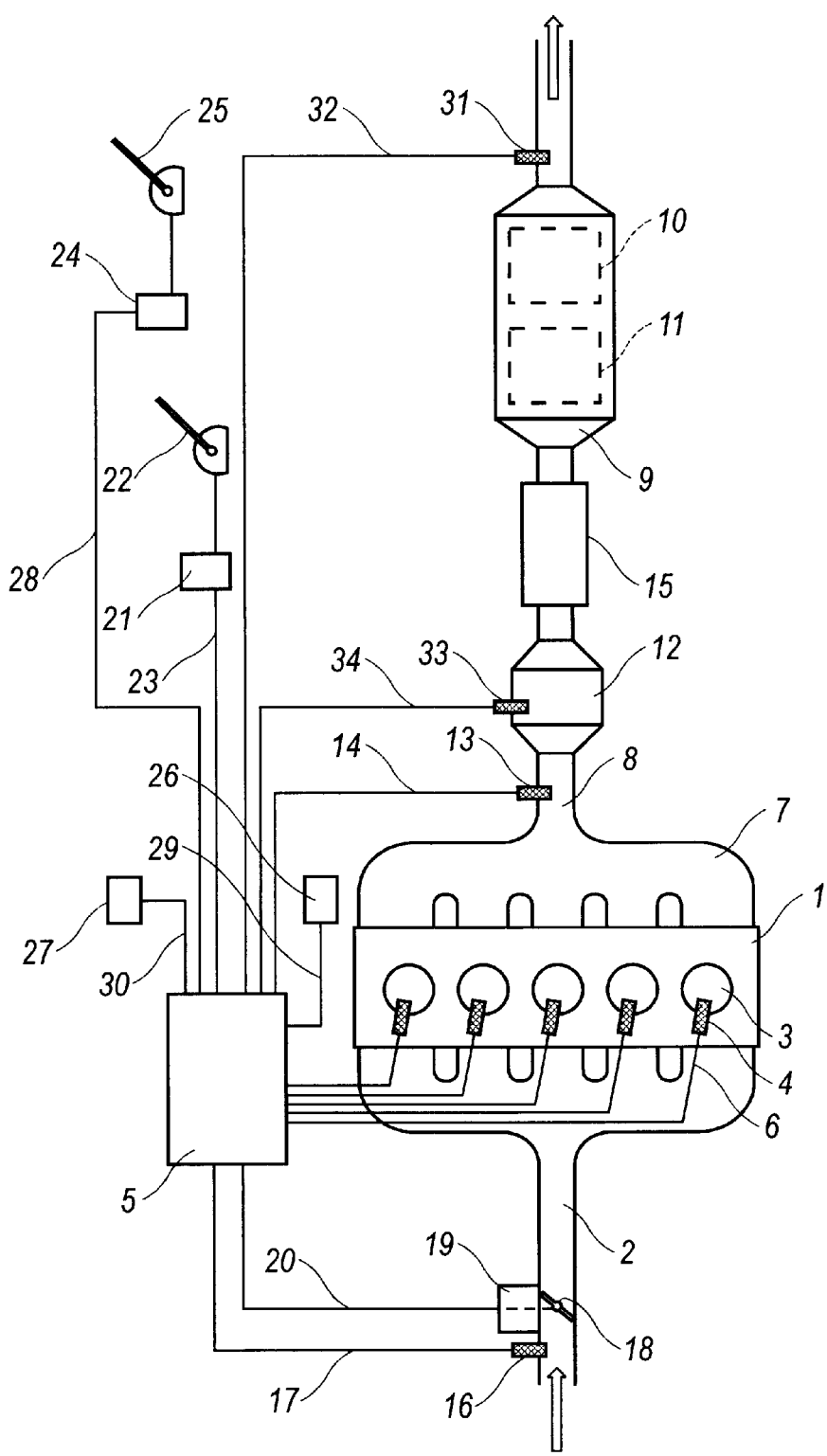
FIG. 1 is an overall schematic diagram illustrating a device according to the present invention connected to an internal combustion engine with which it can be used.

FIG. 1 shows a diagram of the device according to the present invention. In a preferred embodiment, the device according to the invention is connected to an internal combustion engine 1, which can be a conventional gasoline or diesel engine, but is preferably a direct-injection or DI engine, i.e., a spark-ignition engine with direction injection. In this case, the injection of the fuel into the engine 1 is designed for "stratified" operation, wherein the fuel introduced is concentrated in the combustion chamber of the engine. As a result, in certain predetermined operating modes, the engine can run on a very lean air/fuel mixture having a lambda value of an order of magnitude of 4. Such an engine affords a significant fuel economy in comparison with engines run on a stoichiometric mixture, i.e., one with a lambda value of 1. However, such an engine is also suitable for "homogeneous" operation wherein a stoichiometric or relatively rich air/fuel mixture is used. Preferably, the engine 1 performs a stratified operation when it is driven under a low or medium engine loading, and a homogenous operation when it is driven under a relatively high engine loading.

The engine 1 is supplied with air through an air inlet 2. The engine 1 has a number of cylinders 3 and a corresponding number of fuel injectors 4. These injectors 4 are connected to a central control unit 5 via electrical connections 6. The control unit 5 is preferably a computerized device and is designed for controlling the fuel supply to the injectors 4 from a fuel tank (not shown) in such a way that an appropriate air/fuel mixture is fed into the engine 1 at any given moment. In the preferred embodiment, the engine 1 is of the multi-point injection type where the engine 1 is supplied with the right amount of fuel via the corresponding individual injectors 4.

During operation of the engine 1, the control unit 5 regulates the air/fuel mixture for the engine 1 so that it is adapted at any given moment to the operating conditions prevailing at the time. The regulation of the engine 1 is essentially performed in a conventional manner, i.e., on the basis of various parameters that reflect the operating conditions of the engine 1 and the vehicle at the time. The engine can be regulated, e.g., on the basis of the current displacement of the accelerator, the number of revolutions of the engine per minute, the amount of air injected into the engine, and the concentration of oxygen in the exhaust gas at the time.

The engine 1 illustrated has five cylinders, but it should be understood that the device according to the invention can also be used with engines having a different number of cylinders and different cylinder configurations. The injector 4 is preferably of the type that injects the fuel directly into the corresponding cylinder 3, but the device according to the invention can also be used with "port injected" engines. Furthermore, the device according to the invention can also be employed with a "single-point" injection system, where a single fuel injector is placed in the inlet of the engine.

The exhaust gas of the engine 1 is led out of the cylinders 3 through an exhaust manifold 7 and into an exhaust pipe 8 fitted to the exhaust manifold 7. Further downstream along the exhaust pipe 8 is preferably located a $NO_X$-adsorbing catalytic converter 9, composed of a conventional three-way catalyst 10 and a $NO_X$ adsorber 11. The absorber is a conventional type, designed so that it can adsorb $NO_X$ compounds flowing out of the engine 1 through the exhaust pipe 8. The catalytic converter 9 preferably contains a three-way catalyst 10 that is integral with the $NO_X$ adsorber 11. As such, the catalytic converter 9 is an integrated unit comprising both a $NO_X$-adsorbing material and a noble metal that performs the function of a conventional three-way catalyst. This integrated unit is referred to herein as a "$NO_X$-adsorbing catalytic converter", or simply a "catalytic converter". Alternatively, the catalytic converter 9 can be arranged as a separate component fitted in connection with the three-way catalyst 10. Irrespective of the embodiment in question, the $NO_X$ adsorber 11 is schematically shown as a separate unit using broken lines. The exhaust gas then flows from the engine 1 through the exhaust pipe 8 and through the catalytic converter 9 into the atmosphere.

As mentioned before, the engine 1 may be a direct-injection engine, wherein an air/fuel mixture with a lambda value of an order of magnitude of 4 can be fed into the cylinders 3 during normal driving (stratified mode) using a lean air/fuel mixture. For such a lean mixture, the $NO_X$ compounds in the exhaust gas coming from the engine 1 are not reduced in the three-way catalyst 10 but are instead adsorbed by the $NO_X$ adsorber 11.

In this embodiment, the engine 1 is also fitted with a pre-catalyst 12 located upstream of the catalytic converter 9. The pre-catalyst 12 is designed to ensure a quick catalyst warm-up when the engine 1 is started up from cold, i.e., it is a unit whose catalytic layer becomes active quickly. This ensures a significant elimination of the HC, CO and $NO_X$ compounds in the exhaust gas, especially in the case of a low exhaust rate on idling. By ensuring, with the aid of the pre-catalyst 12, that the exhaust gas passing through is quickly heated, one also shortens the time required to heat up the downstream catalytic converter 9. This time is the time that elapses before the catalytic converter 9 is warmed up to that temperature at which it can reduce a predetermined portion of the harmful substances in the exhaust gas. This ensures an effective purification of the exhaust gas from the engine 1, especially in the case of a cold start.

The system also contains a sensor 13 that detects the concentration of oxygen in the exhaust gas. The sensor 13 is preferably a linear lambda probe and is connected to the control unit 5 with the aid of an electrical connection 14. The sensor 13 is preferably placed in the exhaust pipe 8 at a point upstream of the pre-catalyst 12, but it can also be located in a different position, e.g., between the pre-catalyst 12 and the catalytic converter 9.

According to the invention, a heat exchanger 15 is inserted between the pre-catalyst 12 and the catalytic converter 9. The construction and operation of this unit is described below in detail. The heat exchanger 15 adapts the temperature of the exhaust gas flow so as to ensure the right working temperature for the catalytic converter 9 in the prevailing mode of operation of the engine 1 and the vehicle at the time.

In the device of the present invention, both the catalytic converter 9 and the pre-catalyst 12 have a predetermined oxygen storage capacity wherein they can take up and store a certain oxygen reserve. This construction of a three-way catalyst is known in the art. It is based on the realization that, if the catalytic material can store a certain amount of oxygen, catalytic reactions in the three-way catalyst (i.e., the oxidation of the hydrocarbons and the carbon monoxide and the reduction of the nitrogen oxides) can take place when there is a certain excess of either air or fuel in the exhaust gas compared to the stoichiometric ratio, where the lambda value is 1. As described below, the catalytic converter 9 is preferably made with an oxygen storage capacity much greater than that of the pre-catalyst 12. More specifically, the ratio between the oxygen storage capacity of the pre-catalyst 12 and that of the catalytic converter 9 is at least about 1:2, and preferably between about 1:5 and about 1:30.

An air flow-meter 16 is fitted in the air inlet 2. This is a conventional air flow-meter that is connected to the control unit 5 via a separate connection 17 and gives a signal proportional to the amount of air flowing into the engine 1. The system also contains a butterfly valve 18 for the fuel setting that is preferably operated electrically. For this purpose, the butterfly valve 18 is equipped with an adjustable actuating motor 19 whereby the valve is placed in the desired position. This ensures that a suitable amount of air is fed into the engine 1 according to the mode of operation at the time. The actuating motor 19 is coupled to the control unit 5 with the aid of a separate connection 20. The system also incorporates a position sensor 21 for the accelerator pedal 22 for controlling the butterfly valve 18 for the fuel setting. This position sensor 21 senses the position of the accelerator pedal 22 and sends a signal to the control unit 5 via a separate connection 23 according to its position, i.e., it sends a value corresponding to the current displacement of the accelerator.

Furthermore, the control unit 5 is connected to a number of additional sensors shown schematically in FIG. 1. These preferably include a position sensor 24 for sensing the position of the brake pedal 25 of the vehicle, a speed sensor 26 for detecting the number of revolutions of the engine 1 per minute, and a pressure sensor 27 for detecting the pressure in the brake booster of the vehicle (not shown). These sensors 24, 26, 27 are coupled to the control unit 5 via their corresponding electrical connections 28, 29, 30.

The system preferably also comprises an $NO_X$ sensor 31 for detecting the concentration of $NO_X$ compounds in the exhaust gas. The $NO_X$ sensor 31 is coupled to the control unit 5 with the aid of a separate electrical connection 32. The $NO_X$ sensor 31 can be placed in various positions in the exhaust system, e.g., between the pre-catalyst 12 and the catalytic converter 9, or downstream of the catalytic converter 9 as illustrated. Furthermore, there is preferably also a temperature sensor 33 connected to the pre-catalyst 12. The temperature sensor 33 is coupled to the control unit 5 with the aid of a separate electrical connection 34. It gives a signal that reflects the temperature of the pre-catalyst 12. The signal from the temperature sensor 33 may also be used to measure the temperature of the catalytic converter 9. As an alternative or in addition to the temperature sensor 33, the catalytic converter 9 temperature may be obtained from a preconfigured mathematical model stored in the control unit 5. For example, such a model can use a pre-established connection between the temperature of the pre-catalyst 12 and that of the catalytic converter 9. Alternatively, a temperature sensor can be fitted in some other position along the exhaust pipe, for example between the pre-catalyst 12 and the heat exchanger 15. The temperature sensor then gives a signal that is proportional to the temperature of the exhaust gas flowing through the exhaust pipe 8.

Figure 2:
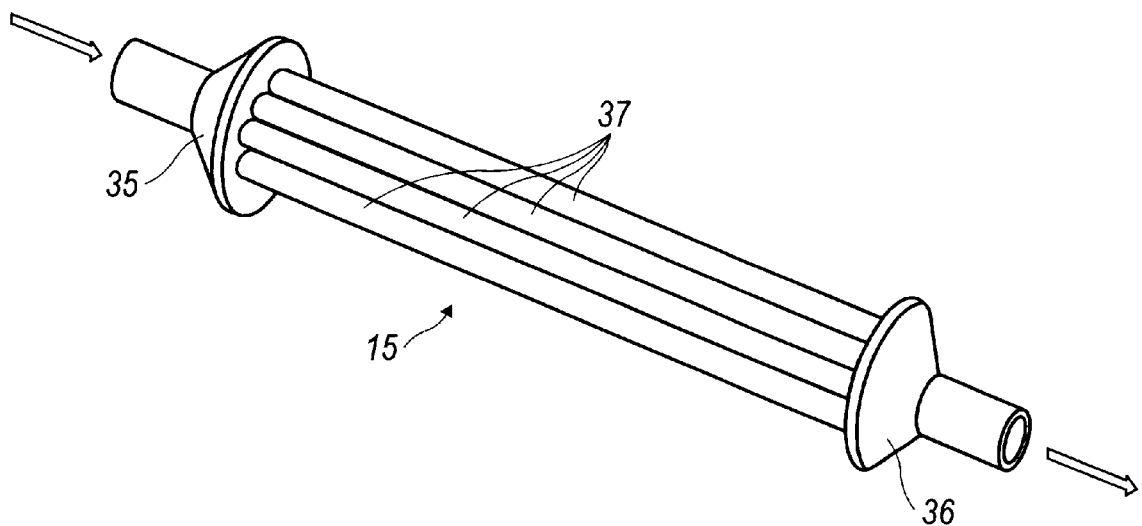
FIG. 2 is a side perspective of the heat exchanger used according to the present invention.
Figure 3:
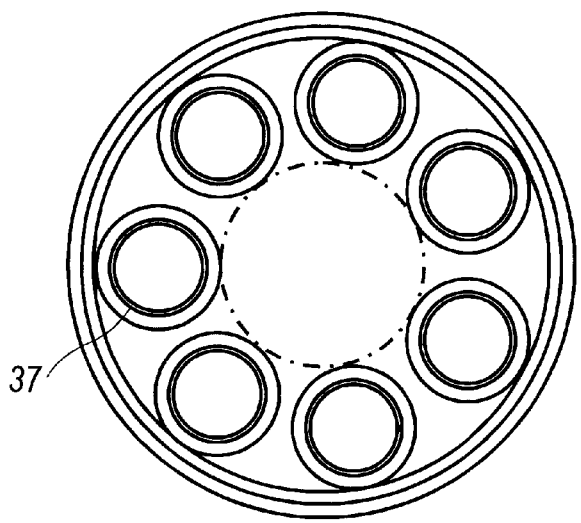
FIG. 3 is a cross section view of the heat exchanger.

FIG. 2 is a perspective drawing of a heat exchanger 15 according to the invention. In this embodiment, the heat exchanger is an elongated unit with an inlet 25, an outlet 36 and a number of straight cooling tubes 37. The heat exchanger 15 is constructed such that exhaust gas from the engine enters its inlet 35, passes through the cooling tubes 38 and exits at the outlet 36, with the direction of flow being indicated by the arrows in the drawing. Referring to FIG. 3, a cross section of the tubes 37 is provided wherein it can be seen that they are preferably arranged in such a way that their centers lie on a circle. In this embodiment, there are seven tubes 37, but there can also be more or less of them within the scope of the invention. The number, diameter and length of these tubes are chosen on the basis of, e.g., the amount and flow rate of the exhaust gas. Other factors that affect the location and dimensions of the tubes 37 are the space available in the vehicle in question, the desired back pressure, and the necessary cooling surface area of the heat exchanger 15. The tubes 37 are made of stainless steel or a material with similar properties.

In this embodiment, all tubes 37 essentially have the same dimensions so that exhaust gas flowing through them can be distributed essentially equally among them. FIG. 3 is a cross section taken through the heat exchanger 15 at a point between its inlet 35 and outlet 36. Since the tubes 37 are positioned on a circle, the temperature of each individual tube 37 is essentially the same during operation. As such, thermal stresses are avoided because all tubes are exposed to the same amount of radiating heat from both the exhaust gas and the adjacent tubes.

Figure 4:
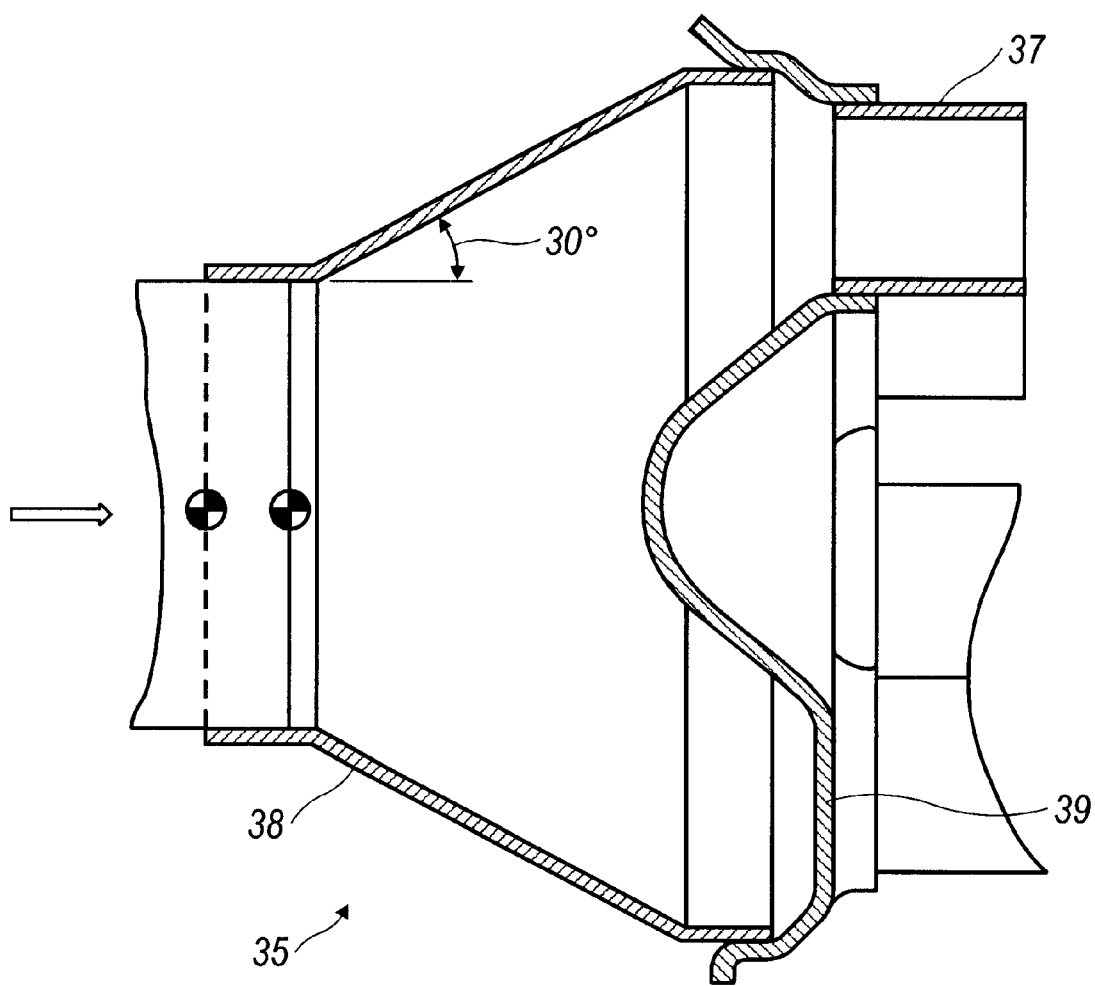
FIG. 4 illustrates a side sectional view of the inlet of the heat exchanger in detail.

FIG. 4 shows the inlet 35 of the heat exchanger in detail. This inlet 35 comprises an inlet cone 38 through which the exhaust gas flows. This inlet cone 38 is connected to a cap 39, preferably by welding, which is in turn provided with orifices for fixing the tubes 37 in them. The inside of the cap 39 has a part that is convex towards the entering exhaust gas ensuring that the latter is distributed essentially equally among the tubes 37. Therefore, the convex part is given an essentially hemispherical shape ensuring that the same amount of gas flows into each tube. This means that the temperature of the gas is essentially the same in all the tubes. The arrangement also permits a relatively low back pressure in the heat exchanger 15, which is an advantage. Another advantage of this arrangement is that it minimizes the ineffective cooling surface area, which in turn reduces the weight and cost of the unit. In addition, the possible effect of the radiating heat from the adjacent tubes is reduced.

The outlet 36 of the heat exchanger 15 is so constructed that it is identical to its inlet 35 (see FIG. 2), giving a cost advantage as fewer different components are thus needed for the heat exchanger 15.

The following description shows how $NO_X$ regeneration and $SO_X$ regeneration occurs with the aid of the device according to the invention. When the engine 1 is a direct-injection engine, it can run on a very lean air/fuel mixture during normal continuous driving, i.e., on a mixture with a lambda value of the order of magnitude of 4. Accordingly, the exhaust gas flowing through the exhaust pipe 8 and the catalytic converter 9 is also lean. It is well known that the catalytic converter 9 then adsorbs the $NO_X$ compounds that are present in the exhaust gas.

After operating with a lean exhaust gas for a certain amount of time (normally about 1 to about 2 minutes), the catalytic converter 9 "gets full", i.e., its catalytic material becomes saturated. As a result, the catalytic converter 9 cannot take up any more $NO_X$ compounds from the exhaust gas and therefore must be regenerated. $NO_X$ regeneration is conventionally done by passing a relatively rich exhaust gas mixture through the catalytic converter 9 for a certain amount of time. This exhaust gas is obtained by running the engine 1 on a relatively rich air/fuel mixture for a certain amount of time, for example, a few seconds, under the guidance of the control unit 5. This leads to the desorption of $NO_X$ compounds that have been adsorbed by the catalytic converter 9, so that the latter can again adsorb $NO_X$ compounds for a certain amount of time before another regeneration becomes necessary. Once the $NO_X$ compounds have been desorbed from the catalytic converter 9, they can then be reduced with the aid of the catalyst layer that forms an integral part of the catalytic converter 9.

As mentioned previously, sulfur compounds eventually deposit on the catalytic converter 9 preventing the converter 9 from adsorbing any $NO_X$ compounds. Therefore, a sulfur regeneration is carried out by using up a certain amount of the oxygen stored in the oxygen reserve of the catalytic converter 9 for burning. More specifically, first the uncombusted hydrocarbons in the exhaust gas are burned off in the catalytic converter 9 with oxygen stored in the oxygen reserve while the engine 1 is being operated in such a way that a rich exhaust gas is being produced. In this way, heat is generated while the oxygen reserve is being gradually depleted. When the oxygen reserve has been depleted at least in part, the engine 1 is switched over to another mode of operation wherein it instead generates a relatively lean exhaust gas, i.e., one with an oxygen excess. This makes it possible to store a new quantity of oxygen in the oxygen reserve of the catalytic converter 9. The engine 1 switches over to running rich, repeating the process, and depleting the oxygen reserve of the catalytic converter 9, which is accompanied by heat production. The heat production that occurs during the repeated burning of the uncombusted hydrocarbons raises the temperature of the exhaust gas above about 650° C., at which sulfur regeneration can take place. The heat exchanger 15 helps to limit the temperature of the exhaust gas so that it does not exceed about 800° C., above which the catalytic converter 9 may be damaged.

The above alternating process continues for a certain time based on how much of the sulfur accumulating in the catalytic converter 9 has been eliminated. This period can be estimated from the sulfur content of the fuel used in the engine 1 and the fuel consumption of the vehicle in question. These parameters are stored in the control unit 5. For this purpose, the signal from the temperature sensor 33 can also be used in conjunction with some algorithms stored in the control unit 5 in advance. These algorithms define a correlation between the temperature measured by the temperature sensor 33 and the temperature prevailing in the catalytic converter 9. These algorithms take into account, for example, the amount of oxygen stored in the catalytic converter 9 and the length of the period during which the uncombusted hydrocarbons are burned off in the catalytic converter 9 as described above. In this way, the control unit 5 can be used for controlling the amount of heat produced in the catalytic converter 9, as well as determining whether the temperature in the catalytic converter 9 has exceeded the value of about 650° C. long enough to ensure that sulfur regeneration occurs.

A similar burning process with stored oxygen also occurs in the pre-catalyst 12 during operation with a rich exhaust gas. As stated above, the oxygen storage capacity of the pre-catalyst 12 is much lower than that of the catalytic converter 12. As a result, only a small part of the uncombusted hydrocarbons released from the engine 1 is burned in the pre-catalyst 12. The greater part of the uncombusted hydrocarbons instead travels along the exhaust pipe 8 and is burned off in the catalytic converter 9. This means that the main heat production occurs where it is actually needed, i.e., in the catalytic converter 9. This ensures the effective sulfur regeneration of the catalytic converter 9.

The sulfur regeneration process is described in detail below. It is assumed that $NO_X$ regeneration of the catalytic converter proceeds continuously. In the preferred embodiment, the engine 1 is a direct-injection engine that is designed in such a way that it produces a relatively lean exhaust gas in a certain mode of operation, e.g., when the vehicle is driven continuously under a medium high engine loading. During such an operation, the system checks whether sulfur regeneration is necessary. Therefore, the control unit 5 is designed to determine the value of lost $NO_X$ storage capacity of the catalytic converter 9, which is done on the basis of, e.g., the sulfur content of the fuel used in the engine 1, the fuel consumption of the vehicle, and the time elapsing since the last regeneration.

When the $NO_X$ storage capacity of the catalytic converter 9 falls below a predetermined value, a sulfur regeneration must be carried out. To initiate this process, the control unit 5 adjusts the air and fuel supply to the engine in such a way that a rich mixture is obtained. The fuel supply to the injectors 4 is adjusted to obtain the required mixture, depending also on other operational parameters of the engine, e.g., the current displacement of the accelerator, the number of revolutions of the engine per minute, and the amount of air injected into the engine. In such manner, the engine 1 is switched over to a mode of operation wherein a rich exhaust gas, having a lambda value under 1 flows through the catalytic converter 9. As explained before, this results in the stored oxygen in the oxygen reserve of the catalytic converter 9 being used for burning off the uncombusted hydrocarbons in the exhaust gas flow. This leads to heat production, which raises the temperature of the exhaust gas flow and the catalytic converter 18 to at least about 650° C.

Under conditions prevailing during the normal driving of a car, the rich exhaust gas causes the oxygen reserve in the catalytic converter 9 to be depleted after a few seconds of operation. When this happens, the control unit 5 switches the engine 1 over to a mode in which it is supplied with a relatively lean air/fuel mixture, producing a relatively lean exhaust gas mixture with a lambda value over 1 for the catalytic converter 9. In this way, the exhaust gas acquires an excess of oxygen so that a new quantity of oxygen is stored in the oxygen reserve of the catalytic converter 9. The control unit 5 then checks whether a sufficient consumption of the stored oxygen in the catalytic converter 9 has taken place, i.e., whether a sufficiently extensive sulfur regeneration has occurred, to determine whether the catalytic converter 9 has recovered its $NO_X$ storing capacity. If the sulfur regeneration is considered to be sufficient, the engine is allowed to return to its original mode of operation using a lean mixture. If the sulfur regeneration is not considered to be sufficient, the engine is switched over to operate with a rich mixture, repeating the above process of alternating rich and lean exhaust gases in the catalytic converter 9.

The time needed to ensure a complete sulfur regeneration of the catalytic converter 18 depends on various factors, such as, for example, the sulfur content of the fuel used in the engine 1, the fuel consumption of the vehicle, the size of the catalytic converter 18, the magnitude of the oxygen reserve in the latter, and the extent of the previous sulfur regeneration steps.

In the above description of the process, it is assumed that the oxygen reserve of the catalytic converter 9 is, in principle, fully depleted when the engine produces a rich exhaust gas mixture. During the following operation wherein a lean exhaust gas is produced, a certain amount of oxygen accumulates in the oxygen reserve of the catalytic converter 9, partly replenishing this reserve. The process is then again switched to an operation that produces a rich exhaust gas. In an alternative, reversed sequence of events, the mode of operation with a lean exhaust gas leads to a basically complete restoration of the oxygen reserve, while the mode of operation with a rich exhaust gas mixture leads to the consumption of only part of the oxygen reserve for burning.

The consumption of the oxygen reserve of the catalytic converter 9 for combustion can also be used in combination with other measures for raising the temperature of the exhaust gas, for example, with a delayed ignition of the fuel in the cylinders 3 in question.

As an alternative to the operation described above, the exhaust system can also be designed whereby a partial $SO_X$ regeneration of the catalytic converter 9 takes place, i.e., a regeneration that does not necessarily continue until the catalytic converter 9 is completely free of sulfur compounds. This may be relevant, for example, when a certain mode of operation means that a relatively rich air/fuel mixture can be supplied to the engine only for a certain time. However, the control unit 5 is designed to store the value for the sulfur deposit continuously, which then acts as the basis of the next regeneration of the catalytic converter 9.

The above $NO_X$ regeneration is preferably initiated when at least one of the predetermined operating situations prevails. An example of such an operating state that can be used according to the invention is one that corresponds to a deliberate change in the torque of the engine 1. This operating state can come about, e.g., as a result of the drivers behavior, such as displacing the accelerator by a certain amount. When the driver wants to overtake, for example, and therefore opens the throttle more, the vehicle accelerates. In a well-known manner, the control unit 5 sends a relatively rich air/fuel mixture to the engine 1 when the vehicle accelerates. For example, the engine 1 can be designed so that it delivers its maximum torque when fed with an air/fuel mixture having a lambda value of 0.9. During acceleration, the driver expects the torque delivered by the engine to increase. This state can be simultaneously utilized for the full or partial regeneration of the $NO_X$ adsorber. For this purpose, the control unit is so designed that, when this state is detected, it ensures the flow of a relatively rich exhaust gas mixture to the $NO_X$ adsorber for a certain time, so that the desired regeneration of the $NO_X$ adsorber can take place. This is an advantage from the point of view of driving comfort, because the driver then does not experience any drawback if a "pulse" of a rich exhaust gas is produced for the regeneration of the $NO_X$ adsorber simultaneously with acceleration. In addition, there is also an advantage with the fuel consumption of the vehicle, since a change in the torque of the engine 1 brought about in any case is utilized for the regeneration.

The control unit is preferably designed so that it checks during operation whether any one of a number of predetermined operating conditions exists. This permits the regeneration of the $NO_X$ adsorber when at least one of these operating conditions prevails. Thus, the control unit 5 is designed to detect whether a state that corresponds to a deliberate change in the torque in the form of a "driver-activated $NO_X$ regeneration" prevails, and if it does, then it generates a "pulse" of a rich exhaust gas. As such, the control unit 5 can detect the angular position of the accelerator pedal 22 with the aid of the position sensor 21. If the displacement of the accelerator exceeds a predetermined limit, i.e., if the opening of the butterfly valve 18 for the fuel setting exceeds a certain limit, the control unit 5 assumes that a driver-activated $NO_X$ regeneration is taking place. In such a case, the control unit 5 chooses an appropriate composition of the air/fuel mixture to feed into the engine that enables regeneration of the $NO_X$ adsorber. Normally, a relatively rich mixture is chosen here, e.g., one with a lambda value of the order of magnitude of 0.7–0.8. This mixture should be retained for a certain time "t1" that is necessary for the full regeneration of the catalytic converter. The value of time t1 corresponding to the state in question may be based on empirical measurements and determined by the control unit 5. As explained in detail below, this time t1 can be set at a value from about a few tenths of a second to about a few seconds.

After the control unit has calculated the appropriate lambda value for regeneration and the value of time t1 during which regeneration is to take place, it initiates regeneration by sending an air/fuel mixture to the engine 1 that gives the calculated rich exhaust mixture for the calculated time. The fuel supply is sent to the injectors 4 shown in FIG. 1 so that the desired mixture is obtained, which mixture is also dependent on, e.g., the amount of air supplied to the engine. This pulse of rich exhaust gas is generated simultaneously with driver acceleration. The driver therefore does not notice any difference with respect to driving comfort when the catalytic converter is regenerated at the same time, which is an advantage of the present invention.

The length of time t1 needed for complete regeneration of the catalytic converter 9 depends on various operating parameters, such as the number of revolutions of the engine 1 per minute, engine loading, and the degree of filling of the catalytic converter 9 at the time. The control unit can be set for the continuous determination of a value of this degree of filling based on various known parameters such as the size of the catalytic converter 9 and the speed with which it fills during lean operation. In this way, regeneration is limited to the time effectively needed for $NO_X$ compounds to be essentially removed. If, for example, at a given moment when "driver-activated regeneration" is detected, the catalytic converter 9 is half full of $NO_X$ compounds and so has a degree of filling of 50%, a relatively small value can be chosen for the time t1. If on the other hand, the $NO_X$ adsorber shows a degree of filling that is substantially 100%, then a relatively high value is chosen for the time t1 needed to ensure a complete regeneration of the $NO_X$ adsorber.

The "driver-activated $NO_X$ regeneration" described above is an example of how the catalytic converter 9 can be regenerated as a result of a deliberate change in the torque of the engine 1. Other examples of a deliberate change in torque that can be utilized for $NO_X$ regeneration include activation of a cruise control mechanism (if there is one in the vehicle), switching on and off of the air conditioning system, switching on and off of a system regulating the stability of the vehicle, activation of a wheel anti-spin system, and activation of a purge function of an exhaust canister used to accommodate the fuel vapors from the fuel tank of the vehicle. All of these measures lead to a change in torque wherein regeneration of the catalytic converter 9 is carried out.

Another state or condition that can be detected and utilized for the $NO_X$ regeneration of the catalytic converter is the extent to which a certain predetermined pressure prevails in the brake booster of the vehicle. Modern vehicles are normally equipped with a brake booster, which comprises a vacuum chamber connected to the engine inlet, so that a negative pressure can be generated in the vacuum chamber during the operation of the engine. This pressure is utilized to ensure the required braking force applied by the brake system. The above mentioned pressure sensor 27 shown in FIG. 1 is then used to measure this pressure. If the pressure value is different from a predetermined limit, the engine is adjusted in such a way that the air-fuel quantity is changed in order to ensure the desired pressure at the engine inlet. If this situation is detected by the control unit, a $NO_X$ regeneration is also initiated whereby the control unit calculates an appropriate lambda value and time period during which a pulse of rich exhaust gas should be present in the catalytic converter. As such, the invention additionally fulfils an automatic control function since it guarantees that a predetermined pressure prevails in the brake booster.

$NO_X$ regeneration can also be controlled based on the position of the brake pedal 25 of the vehicle by using the position sensor 24 connected to the brake pedal 25. For example, application of the brakes by the driver can be utilized to initiate regeneration. As an alternative to detecting the position of the brake pedal 25, the system can use a signal from a pressure sensor (not shown) that senses the braking pressure prevailing in the brake circuit of the vehicle.

The above mentioned operating conditions of the engine and vehicle can be described as "prevailing" operating conditions, or states that arise in the vehicle during its normal operation, meaning that the air/fuel mixture supplied to the engine must be altered. These operating conditions can then be utilized for the simultaneous initiation of a $NO_X$ regeneration of the catalytic converter 9.

As an alternative to the method of operation described above, a partial $NO_X$ regeneration of the catalytic converter 9 may be performed, i.e., one that need not continue until the catalytic converter has been completely freed of the $NO_X$ compounds. This may be relevant, e.g., when a certain operating mode of the vehicle dictates that a relatively rich air/fuel mixture be supplied to the engine only for a certain limited time. In such a case, the catalytic converter is only partially freed of $NO_X$ compounds. However, the control unit is designed for the continuous storage of a value of the degree of filling, which then acts as the basis of the next $NO_X$ regeneration of the catalytic converter 9.

If none of the above operating conditions is present, the catalytic converter 9 must still be given a $NO_X$ regeneration when it is full. For example, if the vehicle in question is driven for a fairly long time without any acceleration (i.e., without any driver-activated $NO_X$ regeneration taking place), the catalytic converter 9 must be compulsorily regenerated when it is full. This corresponds to a regeneration after a certain maximum time $t_2$ has elapsed since the last regeneration. If such time $t_2$ exceeds a certain limit identified by the control unit, a compulsory regeneration must be carried out. The system then proceeds to determine an appropriate lambda value and time t1 during which a pulse of rich exhaust gas should be sent into the catalytic converter 9, whereupon regeneration takes place.

Regarding the two parameters for calculation of the lambda value and the time $t_1$ during which a pulse of rich exhaust gas should be present, these parameters can vary with the operating modes of the vehicle. For example, a pulse of rich exhaust gas with a relatively high lambda value of 0.9 can be utilized if the driver presses the accelerator down hard. Other lambda values can be used in other operating situations, depending on, e.g., which signal is used or on the catalyst in use, etc. Furthermore, in all the above operating conditions, the lambda value and the time $t_1$ can be determined according to the degree of filling of the catalytic converter 9 at the time, i.e., according to how extensive a regeneration is required at the moment. Moreover, a relatively high lambda value may call for a longer time $t_1$ than a lower lambda value. In most cases, the time t1 can be approximately between about 0.5 and about 5 seconds.

The temperature of the pre-catalyst may be used for determining the lambda value and the time t1. In this instance, it is possible to feed into the control unit some tabulated values giving the corrections for the lambda value and/or the time t1 according to the temperature value measured with the aid of a temperature sensor 33, possibly in combination with a software-based estimation of the temperature of the catalytic converter 9 as described above.

$NO_X$ regeneration of the catalytic converter 9 may be carried out by weighing several parameters indicating the necessity of a regeneration. In such a case, the control unit first determines whether one or more of the above operating conditions apply. If this is the case, then a "collective weighing" is carried out by calculating a sum value wherein each observed condition is given a weighted value that is added to this sum. If the sum exceeds a certain predetermined limit, the control unit assumes that regeneration of the catalytic converter is necessary and generates a pulse of rich exhaust gas.

According to the invention, the abovementioned heat exchanger 15 is preferably located upstream of the $NO_X$-adsorbing catalytic converter 9. The heat exchanger 15 acts as a passive component, and is adapted with the aid of the temperature of the exhaust gas from the engine 1 to the prevailing operating state of the vehicle, thereby ensuring an optimum operation of the catalytic converter 9 whereby emission of harmful substances from the engine 1 is reduced as much as possible. For example, for an engine 1 driven in a homogeneous mode, a relatively hot exhaust gas is obtained from the engine 1, i.e., an exhaust gas whose temperature can reach about 950° C. In this situation, the heat exchanger 15 cools the exhaust gas. Due to the construction of the heat exchanger 15, the temperature of the exhaust gas in this state is reduced to a level where it does not damage the catalytic converter 9, i.e., to a value of below about 800° C. Additionally, the atmospheric air also contributes to the cooling of the exhaust gas during driving.

The heat exchanger 15 is also designed such that the exhaust gas temperature during sulfur regeneration is between about 650 and about 800° C. In a lean operation of the engine 1, the heat exchanger 15 assists in ensuring that the exhaust gas temperature is about 200 to about 500° C. In this way, the present invention solves the conflict between the need for a relatively high exhaust gas temperature in the catalytic converter 9 during sulfur regeneration, and a relatively low exhaust gas temperature during lean operation. This is particularly true, since the temperature of the exhaust gas coming directly from the engine 1 in a stratified operation is relatively low. Still, the invention ensures that the exhaust gas is not cooled so much as to reduce this temperature to below about 200° C.

Other embodiments and uses of the present invention may be readily appreciated by one skilled in the art. For example, the pre-catalyst may be an electrically heatable start-up catalyst. Furthermore, the invention can be used with both a conventional butterfly valve for the gas setting and an electrically controlled one. Furthermore, the invention can be used in conjunction with engines that are fitted with a turbo-charger. Components such as the temperature sensor 33, for example, may be placed at sites that are different from the positions described above. For example, the temperature sensor may be located downstream of the catalytic converter 9. In this location, it is possible to check whether the exhaust gas temperature has reached the lower limit of 650° C. for sulfur regeneration.

A heat exchanger for $SO_X$ or $NO_X$ regeneration of catalyst and its components have been described herein. As previously stated, detailed embodiments of the invention are disclosed herein. However, it should be understood that the invention is not limited to the embodiments described above and illustrated in the drawings but can be modified within the scope of the claims that follow.

What is claimed is:

1. A device for use with a lean-burning internal combustion engine comprising:

means for generating an air/fuel mixture for the cylinders of the engine in order to provide at least stratified and homogenous operation, an exhaust system connected to the engine, an $NO_X$-adsorbing catalytic converter arranged in the exhaust system, and a heat exchanger fitted upstream of the catalytic converter, wherein the heat exchanger is used to adapt a temperature of exhaust gases from the engine to an operating state of the catalytic converter, the means for generating an air/fuel mixture being further adapted for sulfur regeneration of the catalytic converter by repeatedly burning oxygen in an oxygen reserve in the catalytic converter together with uncombusted hydrocarbon compounds in the exhaust gases from the engine, thereby raising the temperature of the exhaust gases.

2. The device according to claim 1, further comprising a control unit designed to regulate the means for generating an air/fuel mixture in order to induce a repeated $NO_X$ regeneration and $SO_X$ regeneration of the catalytic converter, the control unit being further designed to set the means for generating an air/fuel mixture in a first operating mode, whereby a relatively lean exhaust gas mixture is generated for the catalytic converter thereby causing adsorption of $NO_X$ compounds present in the exhaust gas mixture, and in a second operating mode, whereby a relatively rich exhaust gas mixture is generated for the $NO_X$ adsorber thereby causing desorption of $NO_X$ compounds present in the exhaust gas mixture.

3. The device according to claim 2 wherein the control unit is able to detect whether at least one condition is present in the vehicle, the at least one condition corresponding to an initiation of a change from the first operating mode to the second operating mode, thereby changing the air/fuel mixture for the engine and initiating the generation of a rich exhaust gas for desorption of $NO_X$ compounds in the catalytic converter according to the operating state.

4. The device according to claim 3 wherein the operating state corresponds to a deliberate change of the torque of the engine.

5. The device according to claim 2 wherein the control unit is designed for an alternating regulation of the internal combustion engine between a first state wherein a relatively rich exhaust gas mixture is fed into the catalytic converter, whereupon the oxygen reserve in the catalytic converter is at least partly used up for the combustion of hydrocarbons in the exhaust system to generate heat, and a second state wherein a relatively lean exhaust gas mixture is fed into the catalytic converter thereby replenishing the oxygen in the oxygen reserve, and wherein the control unit is designed to stop the alternating regulation after a predetermined amount of sulfur compounds has been desorbed from the catalytic converter.

6. A device for use with a lean-burning internal combustion engine comprising:

means for generating an air/fuel mixture for the cylinders of the engine in order to provide at least stratified and homogenous operation, an exhaust system connected to the engine, an $NO_X$-adsorbing catalytic converter arranged in the exhaust system, a heat exchanger fitted upstream of the catalytic converter, wherein the heat exchanger is used to adapt the temperature of the exhaust gas from the engine to an operating state of the catalytic converter, and a control unit designed to regulate the means for generating an air/fuel mixture in order to induce a repeated $NO_X$ regeneration and $SO_X$ regeneration of the catalytic converter.

7. The device according to claim 6, the control unit further designed to set the means for generating an air/fuel mixture in a first operating mode, whereby a relatively lean exhaust gas mixture is generated for the catalytic converter thereby causing adsorption of $NO_X$ compounds present in the exhaust gas mixture, and in a second operating mode, whereby a relatively rich exhaust gas mixture is generated for the $NO_X$ adsorber thereby causing desorption of $NO_X$ compounds present in the exhaust gas mixture.

8. The device according to claim 7 wherein the control unit is able to detect whether at least one condition is present in the vehicle, the at least one condition corresponding to an initiation of a change from the first operating mode to the second operating mode, thereby changing the air/fuel mixture for the engine and initiating the generation of a rich exhaust gas for desorption of $NO_X$ compounds in the catalytic converter according to the operating state.

9. The device according to claim 8 wherein the operating state corresponds to a deliberate change of the torque of the engine.

10. The device according to claim 6 wherein the control unit is designed for an alternating regulation of the internal combustion engine between a first state wherein a relatively rich exhaust gas mixture is fed into the catalytic converter, whereupon the oxygen reserve in the catalytic converter is at least partly used up for the combustion of hydrocarbons in the exhaust system to generate heat, and a second state wherein a relatively lean exhaust gas mixture is fed into the catalytic converter thereby replenishing the oxygen in the oxygen reserve, and wherein the control unit is designed to stop the alternating regulation after a predetermined amount of sulfur compounds has been desorbed from the catalytic converter.

11. A device for use with a lean-burning internal combustion engine comprising:

a control system for generating an air/fuel mixture for the cylinders of the engine in order to provide at least stratified and homogenous operation, an exhaust system connected to the engine, a $NO_X$-adsorbing catalytic converter arranged in the exhaust system, and a heat exchanger fitted upstream of the catalytic converter, wherein the heat exchanger is used to adapt a temperature of exhaust gases from the engine to an operating state of the catalytic converter, the control system being further adapted for sulfur regeneration of the catalytic converter by repeatedly burning oxygen in an oxygen reserve in the catalytic converter together with uncombusted hydrocarbon compounds in the exhaust gases from the engine, thereby raising the temperature of the exhaust gases.

12. The device according to claim 11, the control system being designed to induce a repeated $NO_X$ regeneration and $SO_X$ regeneration of the catalytic converter, the control system further comprising:

a first operating mode, whereby a relatively lean exhaust gas mixture is generated for the catalytic converter thereby causing adsorption of $NO_X$ compounds present in the exhaust gas mixture, and a second operating mode, whereby a relatively rich exhaust gas mixture is generated for the $NO_X$ adsorber thereby causing desorption of $NO_X$ compounds present in the exhaust gas mixture.

13. The device according to claim 12, wherein the control system is able to detect whether at least one condition is present in the vehicle, the at least one condition corresponding to an initiation of a change from the first operating mode to the second operating mode, thereby changing the air/fuel mixture for the engine and initiating the generation of a rich exhaust gas for desorption of $NO_X$ compounds in the catalytic converter according to the operating state.

14. The device according to claim 13 wherein the operating state corresponds to a deliberate change of the torque of the engine.

15. The device according to claim 12 wherein the control system alternately regulates the internal combustion engine between a first state wherein a relatively rich exhaust gas mixture is fed into the catalytic converter, whereupon the oxygen reserve in the catalytic converter is at least partly used up for the combustion of hydrocarbons in the exhaust system to generate heat, and a second state wherein a relatively lean exhaust gas mixture is fed into the catalytic converter thereby replenishing the oxygen in the oxygen reserve, the control system stopping the alternating regulation after a predetermined amount of sulfur compounds has been desorbed from the catalytic converter.

16. A device for use with a lean-burning internal combustion engine comprising:

a control system for generating an air/fuel mixture for the cylinders of the engine in order to provide at least stratified and homogenous operation, the control system being designed to induce a repeated $NO_X$ regeneration and $SO_X$ regeneration of the catalytic converter, an exhaust system connected to the engine, a $NO_X$-adsorbing catalytic converter arranged in the exhaust system, and a heat exchanger fitted upstream of the catalytic converter, wherein the heat exchanger is used to adapt a temperature of exhaust gases from the engine to an operating state of the catalytic converter.

17. The device according to claim 16, the control system further comprising:
a first operating mode, whereby a relatively lean exhaust gas mixture is generated for the catalytic converter thereby causing adsorption of $NO_X$ compounds present in the exhaust gas mixture, and
a second operating mode, whereby a relatively rich exhaust gas mixture is generated for the $NO_X$ adsorber thereby causing desorption of $NO_X$ compounds present in the exhaust gas mixture.

18. The device according to claim 17 wherein the control system is able to detect whether at least one condition is present in the vehicle, the at least one condition corresponding to an initiation of a change from the first operating mode to the second operating mode, thereby changing the air/fuel mixture for the engine and initiating the generation of a rich exhaust gas for desorption of $NO_X$ compounds in the catalytic converter according to the operating state.

19. The device according to claim 18 wherein the operating state corresponds to a deliberate change of the torque of the engine.

20. The device according to claim 17 wherein the control system alternately regulates the internal combustion engine between a first state wherein a relatively rich exhaust gas mixture is fed into the catalytic converter, whereupon the oxygen reserve in the catalytic converter is at least partly used up for the combustion of hydrocarbons in the exhaust system to generate heat, and a second state wherein a relatively lean exhaust gas mixture is fed into the catalytic converter thereby replenishing the oxygen in the oxygen reserve, the control system stopping the alternating regulation after a predetermined amount of sulfur compounds has been desorbed from the catalytic converter.

* * * * *